US008991381B2

(12) United States Patent
Ohya et al.

(10) Patent No.: US 8,991,381 B2
(45) Date of Patent: Mar. 31, 2015

(54) METHOD OF CUTTING WORKPIECE WITH WIRE SAW, AND WIRE SAW

(75) Inventors: Jun Ohya, Hiroshima (JP); Tatsumi Hamasaki, Hiroshima (JP); Hiroyuki Yoshimura, Hiroshima (JP); Masaru Fukuman, Hiroshima (JP)

(73) Assignee: Toyo Advanced Technologies Co., Ltd., Hiroshima (JP)

( * ) Notice: Subject to any disclaimer, the term of this patent is extended or adjusted under 35 U.S.C. 154(b) by 430 days.

(21) Appl. No.: 13/576,738

(22) PCT Filed: Feb. 8, 2010

(86) PCT No.: PCT/JP2010/000751
§ 371 (c)(1),
(2), (4) Date: Aug. 2, 2012

(87) PCT Pub. No.: WO2011/096018
PCT Pub. Date: Aug. 11, 2011

(65) Prior Publication Data
US 2012/0298090 A1     Nov. 29, 2012

(51) Int. Cl.
*B28D 5/04*     (2006.01)
*B23D 57/00*    (2006.01)
*B24B 27/06*    (2006.01)

(52) U.S. Cl.
CPC ............ *B28D 5/045* (2013.01); *B23D 57/0069* (2013.01); *B24B 27/0633* (2013.01)
USPC ........ 125/16.02; 125/16.01; 125/21; 451/296

(58) Field of Classification Search
USPC ............ 451/296, 168, 302; 125/16.01, 16.02, 125/21
See application file for complete search history.

(56) References Cited

U.S. PATENT DOCUMENTS 4,655,191 A * 4/1987 Wells et al. ................. 125/16.01
5,201,305 A * 4/1993 Takeuchi ......................... 125/21
(Continued)

FOREIGN PATENT DOCUMENTS

JP      4-75862      3/1992
JP   2002-254287     9/2002
(Continued)

OTHER PUBLICATIONS

Taiwanese Patent Application No. 099104314—Office Action issued on Nov. 6, 2014.

*Primary Examiner* — Lee D Wilson
*Assistant Examiner* — Tyrone V Hall, Jr.
(74) *Attorney, Agent, or Firm* — Gerald E. Hespos; Michael J. Porco; Matthew T. Hespos

(57) ABSTRACT

The present invention provides a method of cutting a workpiece efficiently with high accuracy by utilizing tension adjusters to approximate tension in a wire in a wire saw to a predetermined target tension while effectively reducing only tension in a winder-side wire. The method comprises a forward-driven cutting step of cutting a workpiece while moving a wire forward, a first switching step of reversing a driving direction of the wire, a backward-driven cutting step of cutting the workpiece while moving the wire backward, and a second switching step of reversing a driving direction of the wire and returning to the forward-driven cutting step, the steps being repeated in this order. In both switching steps, only tension in a winder-side wire is reduced by tension manipulators. A reduction in target wire tension therefor is performed after completion of deceleration of the wire in each switching step.

12 Claims, 6 Drawing Sheets

(56) References Cited

U.S. PATENT DOCUMENTS

| | | | |
|---|---|---|---|
| 5,564,409 A * | 10/1996 | Bonzo et al. | 125/12 |
| 5,628,301 A * | 5/1997 | Katamachi | 125/21 |
| 5,699,782 A * | 12/1997 | Toyama | 125/21 |
| 5,829,424 A * | 11/1998 | Hauser | 125/16.01 |
| 5,865,162 A * | 2/1999 | Kambe et al. | 125/16.02 |
| 5,944,007 A * | 8/1999 | Miyoshi et al. | 125/13.01 |
| 6,024,319 A * | 2/2000 | Kawabata et al. | 242/417.3 |
| 6,178,962 B1 * | 1/2001 | Ohashi et al. | 125/16.01 |
| 2004/0255924 A1 * | 12/2004 | Kondo et al. | 125/41 |
| 2006/0258268 A1 * | 11/2006 | Miyata et al. | 451/41 |
| 2010/0089377 A1 | 4/2010 | Oishi et al. | |

FOREIGN PATENT DOCUMENTS

| | | |
|---|---|---|
| JP | 2007-276054 | 10/2007 |
| TW | 200642796 | 4/1995 |
| TW | 200903613 | 2/1997 |

* cited by examiner

METHOD OF CUTTING WORKPIECE WITH WIRE SAW, AND WIRE SAW

TECHNICAL FIELD

The present invention relates to a method of cutting a semiconductor ingot and the like using a wire saw, and to the wire saw.

BACKGROUND ART

In recent years, wire saws have been known as means for simultaneously cutting a large number of thin sections (for example, wafers) from a workpiece such as a semiconductor ingot. Such a wire saw comprises a wire-feeding bobbin, a plurality of guide rollers, and a wire-winding bobbin, wherein a cutting wire extracted from the wire-feeding bobbin is wound around each of the guide rollers and then retrieved by the wire-winding bobbin. The cutting wire is driven at high speed in a longitudinal direction of the wire by respective rotations of both bobbins and the guide rollers. While the wires driven, a workpiece including the semiconductor ingot or the like is cutting-fed in a direction perpendicular to a plurality of wires aligned between specific guide rollers, and thereby a large number of thin sections are simultaneously cut from the workpiece.

With such a wire saw, it is required to apply tension equal to or greater than a certain level to the wire for cutting a workpiece in a stable manner; however, the greater the tension, the greater a mechanical load acting on the wire-winding bobbin. In other words, the greater the tension in a wire wound by the wire-winding bobbin, the greater the likelihood of the wire biting into an outer peripheral surface of the wire-winding bobbin, resulting in an increased risk in shortening life of the bobbin. Besides, in the case of the wire on which fixed abrasive grains are bonded, there comes an inconvenience in that the abrasive grains are likely to fall off because of an increase in a force of bringing the wires into pressured contact with each other on the wire-winding bobbin.

As means to solve such an inconvenience, it may be considered to use a tension adjuster to reduce winder-side wire tension to below feeding-side wire tension. However, the wire saw described above often adopts, as a system for driving the wire, a reciprocal drive system of running the wire alternately in a forward direction (a direction from the wire-feeding bobbin to the wire-winding bobbin) and a backward direction (a direction from the wire-winding bobbin to the wire-feeding bobbin); if a wire saw with such a reciprocal driving system is applied with the above performing tension adjustment, there may occur a significant decline in processing efficiency.

Specifically, according to the reciprocal driving system, since a sudden reversal of a wire driving direction causes a strong impact, there is required, in reality, a manipulation which involves first decelerating to stop the wire, then restarting driving in a reverse direction from a stopped state, and gradually accelerating the wire up to a target speed. Such a reversal of driving directions can be time consuming. In addition, for reversing the direction of driving of the wire, tension in the wire on a winding side which had been reduced must be increased and, conversely, tension in the wire on a feeding side which had been given high tension must be reduced. Moreover, if such a fluctuation in tension is performed in a sudden manner, there occurs a possibility of a break in the wire or the like; therefore, increasing and decreasing the wire tension also has to be performed in a gradual manner over a certain amount of time. Hence, in addition to the reversal of the driving direction of the wire, an increase or decrease in tension accompanying such a reversal also consumes time.

In consideration therewith, Japanese Patent Application Laid-open No. 2007-276054 below proposes performing an adjustment to increase tension in the wire on a winding side which had been reduced and to reduce tension in the wire on a feeding side which had been given high tension, during deceleration of a wire driving speed for reversing the driving direction of the wire, thereby reducing time loss.

However, with this method, since the adjustment of increasing wire tension on the winding side and reducing wire tension on the feeding side is performed during deceleration of a wire driving speed, there is a risk that a wire portion where tension is reduced by the adjustment may enter a region between guide rollers, that is, a region where a workpiece is cut, which may adversely affect processing accuracy of the workpiece.

SUMMARY OF THE INVENTION

An object of the present invention is to provide a technique capable of effectively reducing time loss due to an adjustment of wire tension upon reversing a driving direction of a wire in a wire saw while preventing such tension adjustment from degrading processing accuracy of a workpiece. As means for achieving the object, the present invention provides a method of cutting a workpiece by using a wire saw in which a cutting wire fed from a wire feeder is wound around a plurality of guide rollers and then wound by a wire winder and by simultaneously performing cutting-feeding of relatively moving the workpiece with respect to a plurality of wires aligned between the guide rollers, while driving the wires in an axial direction thereof. The method comprises: a forward-driven cutting step of cutting the workpiece while feeding the wire from the wire feeder and winding the wire with the wire winder, adjusting tension in a wire fed from the wire feeder so as to approximate the tension in the wire to a first target tension by pressing a feeding-side tension-application member against the wire, and adjusting tension in a wire wound by the wire winder so as to approximate the tension wound by the wire winder to a second target tension lower than the first target tension by pressing a winding-side tension-application member against the wire wound by the wire winder; a backward-driven cutting step of cutting the workpiece while reversely feeding the wire wound by the wire winder from the wire winder and winding the wire with the wire feeder, adjusting tension in a wire fed from the wire winder so as to approximate the tension in the wire fed from the wire winder to a third target tension higher than the second target tension by pressing the winding-side tension-application member against the wire fed from the wire winder, and adjusting tension in a wire wound by the wire feeder so as to approximate the tension in the wire to a fourth target tension lower than either of the first target tension and the third target tension by pressing the feeding-side tension-application member against the wire; a first switching step of decelerating a driving speed of the wire after the forward-driven cutting step, reversing the driving direction of the wire and thereafter accelerating the driving speed of the wire to shift to the backward-driven cutting step; and a second switching step of decelerating a driving speed of the wire after the backward-driven cutting step, reversing the driving direction of the wire and thereafter accelerating the driving speed of the wire to shift to the forward-driven cutting step, wherein the forward-driven cutting step, the first switching step, the backward-driven cutting step, and the second switching step are repetitively performed in this order. In addition, in the first switching step, an adjustment of tension in the wire at a side of the wire winder is performed with the winding-side tension-application member, during the deceleration of the wire driving speed, so as to increase a target tension as to the wire at the side of the wire winder from the second target tension to the third target tension, and an adjustment of tension in the wire at a side of the wire feeder is performed with the feeding-side tension-application member, after completion of the deceleration of the wire driving speed, so as to reduce a target tension as to the wire at the side of the wire feeder from the first target tension to the fourth target tension.

Besides, in the method of cutting a workpiece according to the present invention, instead of shifting the target tension in the first switching step or in addition to shifting the target tension in the first switching step, there may be performed, during the second switching step, an adjustment of tension in the wire at the side of the wire winder with the winding-side tension-application member while reducing a target tension as to the wire at the side of the wire winder from the third target tension to the second target tension, and an adjustment of tension in the wire at the side of the wire feeder with the feeding-side tension-application member while increasing a target tension as to the wire at the side of the wire feeder from the fourth target tension to the first target tension.

Furthermore, the present invention provides a wire saw for simultaneously cutting a workpiece at a plurality of locations using a cutting wire. The wire saw comprises: a plurality of guide rollers arranged so that respective rotational central axes thereof are parallel to each other, the wire being wound the guide rollers; a wire feeder for feeding the wire to the guide rollers; a wire winder for winding the wire from the guide rollers; a cutting feeder which cutting-feeds a workpiece to cut the workpiece by moving a plurality of wires stretched between specific guide rollers among the guide rollers and the workpiece relatively to each other; a wire drive control device which controls respective operations of the wire feeder and the wire winder so as to perform a forward-driven cutting step of cutting the workpiece while feeding the wire from the wire feeder and winding the wire with the wire winder, a backward-driven cutting step of cutting the workpiece while reversely feeding the wire wound by the wire winder from the wire winder and winding the wire with the wire feeder, a first switching step of decelerating a driving speed of the wire after the forward-driven cutting step, reversing the driving direction of the wire and thereafter accelerating the driving speed of the wire to shift to the backward-driven cutting step, and a second switching step of decelerating a driving speed of the wire after the backward-driven cutting step, reversing the driving direction of the wire and thereafter accelerating the driving speed of the wire to shift to the forward-driven cutting step, in an order of the forward-driven cutting step, the first switching step, the backward-driven cutting step, and the second switching step; a feeding-side tension manipulator including a feeding-side tension-application member to be pressed against the wire in a region between the wire feeder and the respective guide rollers, the feeding-side tension manipulator varying the tension in the wire by varying a pressing force of the feeding-side tension-application member; a winding-side tension manipulator including a winding-side tension-application member to be pressed against the wire in a region between the wire winder and the respective guide rollers, the winding-side tension manipulator varying the tension in the wire by varying a pressing force of the winding-side tension-application member; and a tension control device which operates the respective tension manipulators so as to approximate tension in a wire fed from the wire feeder to a first target tension and approximate tension in a wire wound by the wire winder to a second target tension lower than the first target tension in the forward-driven cutting step and so as to approximate tension in a wire fed from the wire winder to a third target tension higher than the second target tension and approximate tension in a wire wound by the wire feeder to a fourth target tension lower than either of the first target tension and the third target tension in the backward-driven cutting step. The tension control device operates the respective tension manipulators, in the first switching step, to perform an adjustment of tension in the wire at the side of the wire winder, during deceleration of the wire driving speed, so as to increase a target tension as to the wire at the side of the wire winder from the second target tension to the third target tension and to perform an adjustment of tension in the wire at the side of the wire feeder after completion of deceleration of the wire driving speed so as to reduce a target tension as to the wire at the side of the wire feeder from the first target tension to the fourth target tension.

Besides, in the wire saw according to the present invention, the tension control device may operate the respective tension manipulators, in the second switching step, instead of shifting the target tension in the first switching step or shifting the target tension in the first switching step, so as to perform an adjustment of tension in the wire at the side of the wire winder while reducing a target tension as to the wire at the side of the wire winder from the third target tension to the second target tension and perform an adjustment of tension in the wire at the side of the wire feeder while increasing a target tension as to the wire at the side of the wire feeder from the fourth target tension to the first target tension, during the second switching step.

BEST MODE FOR CARRYING OUT THE INVENTION

There will be described a preferred embodiment of the present invention with reference to FIGS. 1 to 5.

Figure 1:
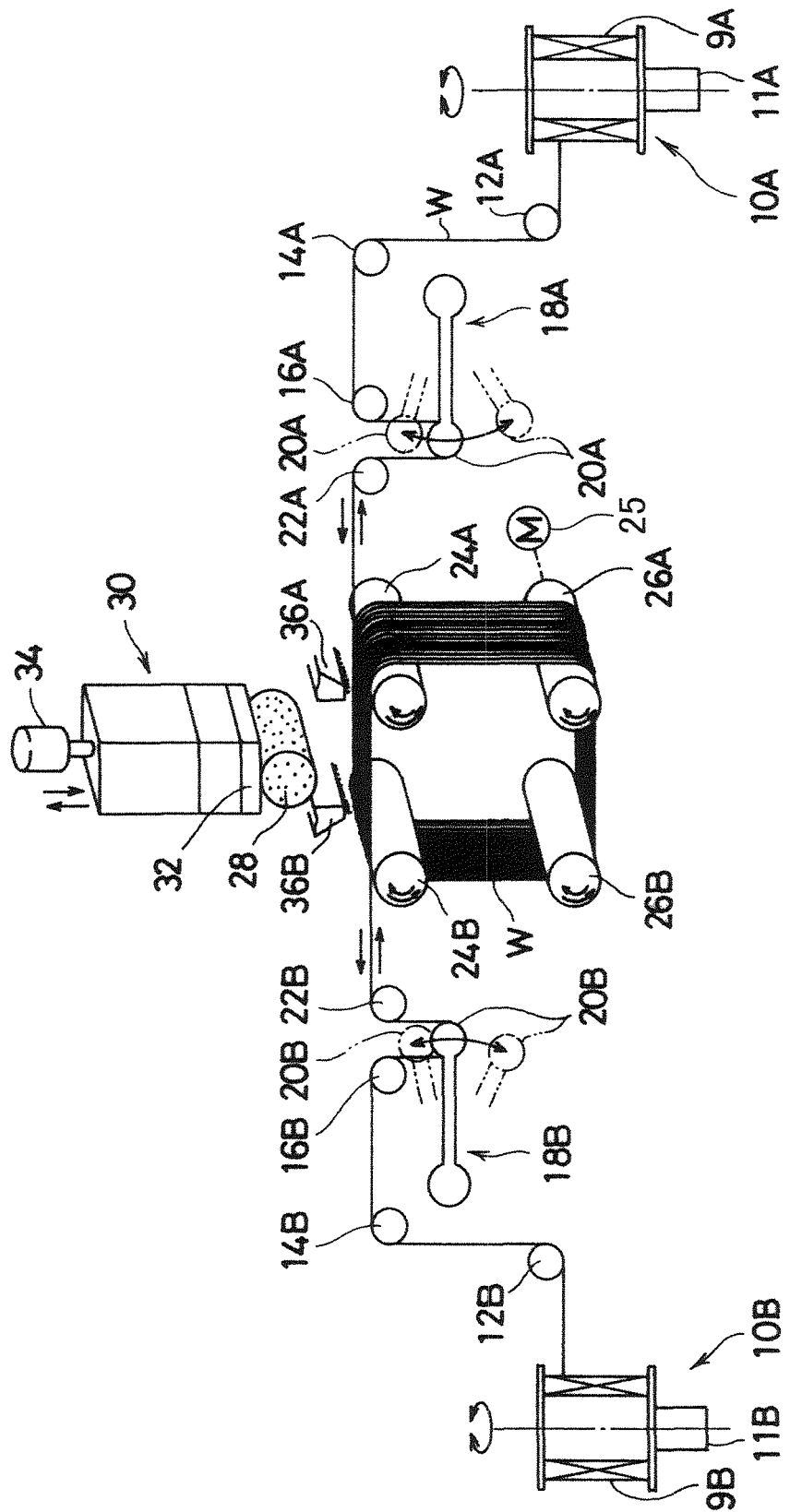
FIG. 1 is an overall configuration diagram of a wire saw according to an embodiment of the present invention.

FIG. 1 shows a wire saw, which comprises a pair of wire feeder/winders 10A and 10B and four guide rollers 24A, 24B, 26A, and 26B arranged therebetween. Among the guide rollers, the guide rollers 24A and 24B are arranged at a same height position, and the guide rollers 26A and 26B are arranged at respective positions under the guide rollers 24A and 24B.

Between the wire feeder/winder 10A and the guide rollers 24A, 24B, 26A, and 26B are provided fixed pulleys 12A, 14A, and 16A, a feeding-side tension manipulator 18A, and a fixed pulley 22A, in a descending order of proximity to the wire feeder 10A, wherein the feeding-side tension manipulator 18A includes a movable pulley 20A that is a feeding-side tension-application member. In a similar manner, between the wire feeder/winder 10B and the guide rollers 24A, 24B, 26A, and 26B are provided fixed pulleys 12B, 14B, and 16B, a winding-side tension manipulator 18B, and a fixed pulley 22B, in a descending order of proximity to the wire winder 10B, wherein the winding-side tension manipulator 18B includes a movable pulley 20B that is a winding-side tension-application member.

Each of the wire feeder/winders 10A and 10B includes bobbins 9A and 9B around which a cutting wire W is wound and bobbin drive motors 11A and 11B which rotationally drive the bobbins 9A and 9B. The wire W fed from the bobbin 9A of the wire feeder 10A is: sequentially passed around the fixed pulleys 12A, 14A, and 16A, the movable pulley 20A of the tension manipulator 18A, and the fixed pulley 22A; wound a large number of times around the outside of the guide rollers 24A, 24B, 26A, and 26B; sequentially passed around the fixed pulley 22B, the movable pulley 20B of the tension manipulator 18B, and the fixed pulleys 16B, 14B, and 12B; and then wound by the bobbin 9B of the wire winder 10B, while both tension manipulators 18A and 18B apply appropriate tension to the wire W. Besides, the wire saw includes a roller drive motor 25, which is coupled to a rotational shaft of a specific guide roller (in the drawings, the guide roller 26A) of the guide rollers 24A, 24B, 26A, and 26B to rotationally drive the rotational shaft.

In the wire saw, a rotational driving direction of the bobbins 9A and 9B by the respective bobbin drive motors 11A and 11B and a rotational driving direction of the guide roller 26A by the roller drive motor 25 can be switched between forward and backward. Drive conditions of the wire W are thereby switched between a condition where the wire W is fed from the bobbin 9A and wound by the bobbin 9B and a condition where the wire W is fed from the bobbin 9B and wound by the bobbin 9A.

Thus, in the wire saw according to the present embodiment, a large number of wires W are aligned between the guide rollers 24A and 24B among the four guide rollers, and reciprocally driven in a longitudinal direction (axial direction) thereof. Meanwhile, the present invention does not specifically restrict the number of guide rollers, which number may be set to any number equal to or greater than two.

Above the wire W stretched between the guide rollers 24A and 24B, there is provided a workpiece feeder 30 which moves a cylindrical workpiece (for example, a semiconductor ingot) 28. The workpiece feeder 30 includes a workpiece holding unit 32 which holds the workpiece 28 and a workpiece feeding motor 34. The orientation of the workpiece which the holding unit 32 holds is set to an orientation which can provide a desired crystal orientation, based on a crystal axis thereof. In cooperation with a ball screw not shown, the workpiece feeding motor 34 integrally raises and lowers, namely, cutting-feeds, the workpiece holding unit 32 and the workpiece 28. The workpiece feeding motor 34 according to the present embodiment is constituted by a servo motor and doubles as feed position detecting means which detects a cutting feed position of the workpiece 28.

Slurry feeders 36A and 36B are provided at respective positions on left and right sides of the workpiece 28 above the wire W stretched between the guide rollers 24A and 24B. The slurry feeders 36A and 36B simultaneously supply a working fluid (slurry) mixed with an abrasive grain to each of the wires W being driven at high speed to make the working fluid (slurry) adhere to a surface of the wires W.

Hence, in this wire saw, a large number of wires W stretched between the guide rollers 24A and 24B are simultaneously driven at high speed longitudinally thereof and the workpiece 28 is cutting-fed downward with respect to the wires W while a working fluid is supplied to the wires W from the slurry feeders 36A and 36B; thus, a large number of wafers can be simultaneously cut from the workpiece 28.

Next will be described a structure of the tension manipulators 18A and 18B with reference to FIGS. 2 and 3. Herein, the tension manipulators 18A and 18B are configured the same, and, for the reason, only the tension manipulator 18A will be described as an example.

The movable pulley 20A is arranged between the fixed pulleys 16A and 22A, and the pulleys 16A, 20A, and 22A are arranged so that a wire length varies as the movable pulley 20A is moved upward or downward. Specifically, the descent of the movable pulley 20A increases the wire length, while the ascend of the movable pulley 20A decreases the wire length.

The tension manipulator 18A includes a supporting member 38 which rotatably supports the fixed pulley 22A and a tension detector 40 mounted to the supporting member 38. The tension detector 40 detects a load applied to the supporting member 38 and, by extension, tension in the wire W. As the tension detector 40 can be used a load cell, a combination of a differential transformer and a spring, and the like.

The movable pulley 20A is mounted to a tip of a lever 44 so as to be rotatable around a rotational shaft 42 perpendicular to the axial direction of the wire W. The lever 44 has a base end, to which a rotational central shaft 46 is fixed, the rotational central shaft 46 being supported by a fixing side plate 48. Specifically, a swinging cylinder 50 is fixed to the fixing side plate 48 and the rotational central shaft 46 is coupled to the swinging cylinder 50. The swinging cylinder 50 is adapted to rotationally move the lever 44 and the movable pulley 20A around and together with the rotational central shaft 46 to press the movable pulley 20A against the wire W, thus applying tension to the wire W, and further adapted to increase or reduce a press force thereof to vary the tension.

To the rotational central shaft 46 is coupled an encoder 52. The encoder 52 is adapted to detect a rotational angular position of the rotational central shaft 46, that is, a position of the movable pulley 20A.

Figure 4:
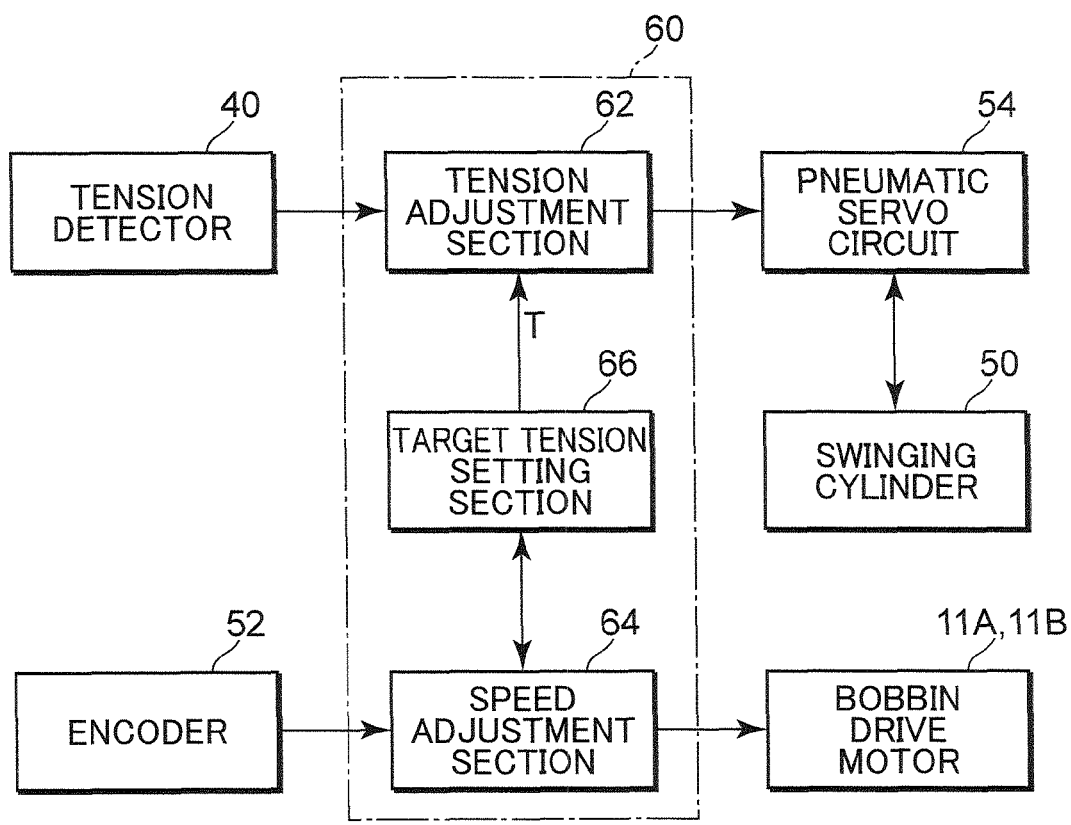
FIG. 4 is a block diagram showing a functional configuration of a controller provided in the wire saw.

The wire saw is provided with a controller 60 as shown in FIG. 4. The controller 60, which functions as a tension control device, includes a tension adjustment section 62, a speed adjustment section 64, and a target tension setting section 66.

The tension adjustment section 62 outputs an electric signal to a pneumatic servo circuit 54 that drives the swinging cylinder 50 to adjust a driving force of the swinging cylinder 50 and, by extension, wire tension, so as to maintain respective wire tensions detected by the tension detectors 40 on the wire-feeder side and the wire-winding side at a target tension T set by the target tension setting section 66. Specifically, when the detected tension on the side of the wire feeder/winder 10A is higher than the target tension T, the tension adjustment section 62 reduces a driving force of the swinging cylinder 50 to rotationally move the lever 44 coupled to the swinging cylinder 50 upward, thereby reducing a force by which the movable pulley 20A supported by the lever 44 is pressed against the wire W. Conversely, when the detected tension is lower than the target tension T, the tension adjustment section 62 increases the driving force of the swinging cylinder 50 to rotationally move the lever 44 downward in a counter-clockwise direction in FIG. 2, thereby increasing the force by which the movable pulley 20A is pressed against the wire W.

The speed adjustment section 64 adjusts a bobbin driving direction and a bobbin driving speed by the bobbin drive motors 11A and 11B so as to cause a forward-driven cutting step, a first switching step, a backward-driven cutting step, and a second switching step, which steps are described in detail later, to be repetitively performed in this order as steps for cutting the workpiece 28 while driving the wire W.

In the forward-driven cutting step, cutting of the workpiece 28 is carried out while the wire W is fed from the wire feeder 10A and wound by the wire winder 10B. Conversely, in the backward-driven cutting step, cutting of the workpiece is carried out while the wire W that had been wound by the wire winder 10B is fed from the wire winder 10B and wound by the wire feeder 10A.

In the first switching step, the driving speed of the wire W is decelerated after the forward-driven cutting step, and, after the direction of driving is reversed, the driving speed of the wire is accelerated. The step is thus shifted to a next backward-driven cutting step. On the other hand, in the second switching step, the driving speed of the wire is decelerated after the backward-driven cutting step, and, after the direction of driving is reversed, the driving speed of the wire is accelerated. The step is thus shifted to a next forward-driven cutting step.

Figure 2:
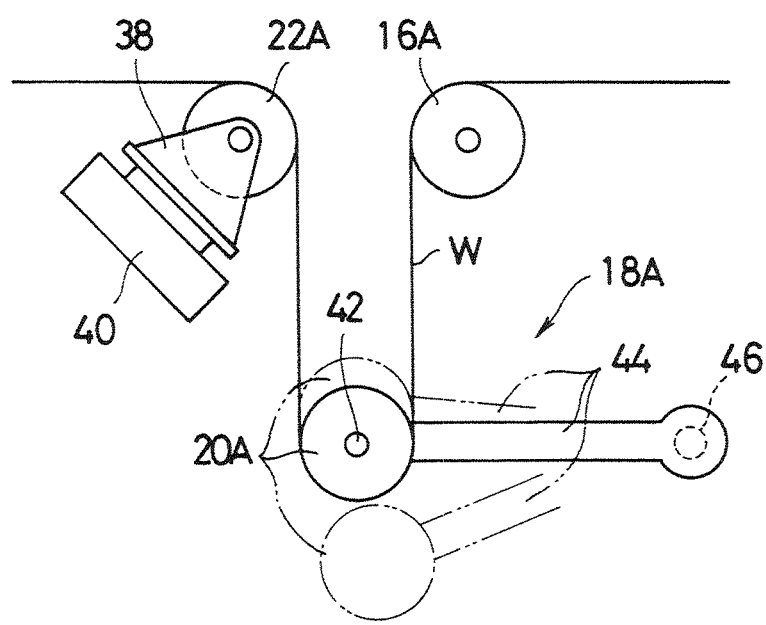
FIG. 2 is a front view of a tension manipulator provided in the wire saw.
Figure 3:
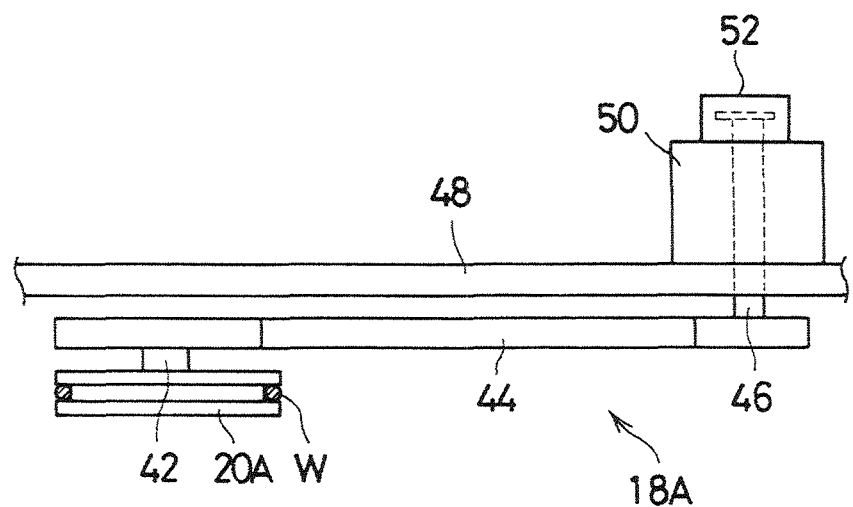
FIG. 3 is a front view of the tension manipulator.

The speed adjustment section 64 according to the present embodiment also functions to output respective control signals to the bobbin drive motors 11A and 11B to finely adjust respective rotational speeds of both bobbins 9A and 9B so as to approximate the positions of the movable pulleys 20A and 20B detected by the encoder 52 to a reference position set in advance (in this case, a position to make the lever 44 be horizontal as depicted by solid lines in FIG. 2). For example, when the feeding-side movable pulley 20A is detected to be at a position lower than the reference position while the wire W is fed from the bobbin 9A and wound by the bobbin 9B, the speed adjustment section 64 reduces the rotational speed of the bobbin 9A on the side of the wire feeder to raise the movable pulley 20A; conversely, when the movable pulley 20A is detected to be at a position higher than the reference position, the speed adjustment section 64 increases the rotational speed of the bobbin 9A on the side of the wire feeder to lower the movable pulley 20A. On the other hand, when the wire winder-side movable pulley 20B is detected to be at a position lower than a reference position, the speed adjustment section 64 increases the rotational speed of the bobbin 9B on the side of the wire winder to raise the movable pulley 20B; conversely, when the movable pulley 20B is detected to be at a position higher than the reference position, the speed adjustment section 64 reduces the rotational speed of the bobbin 9B on the side of the wire winder to lower the movable pulley 20B.

Figure 5:
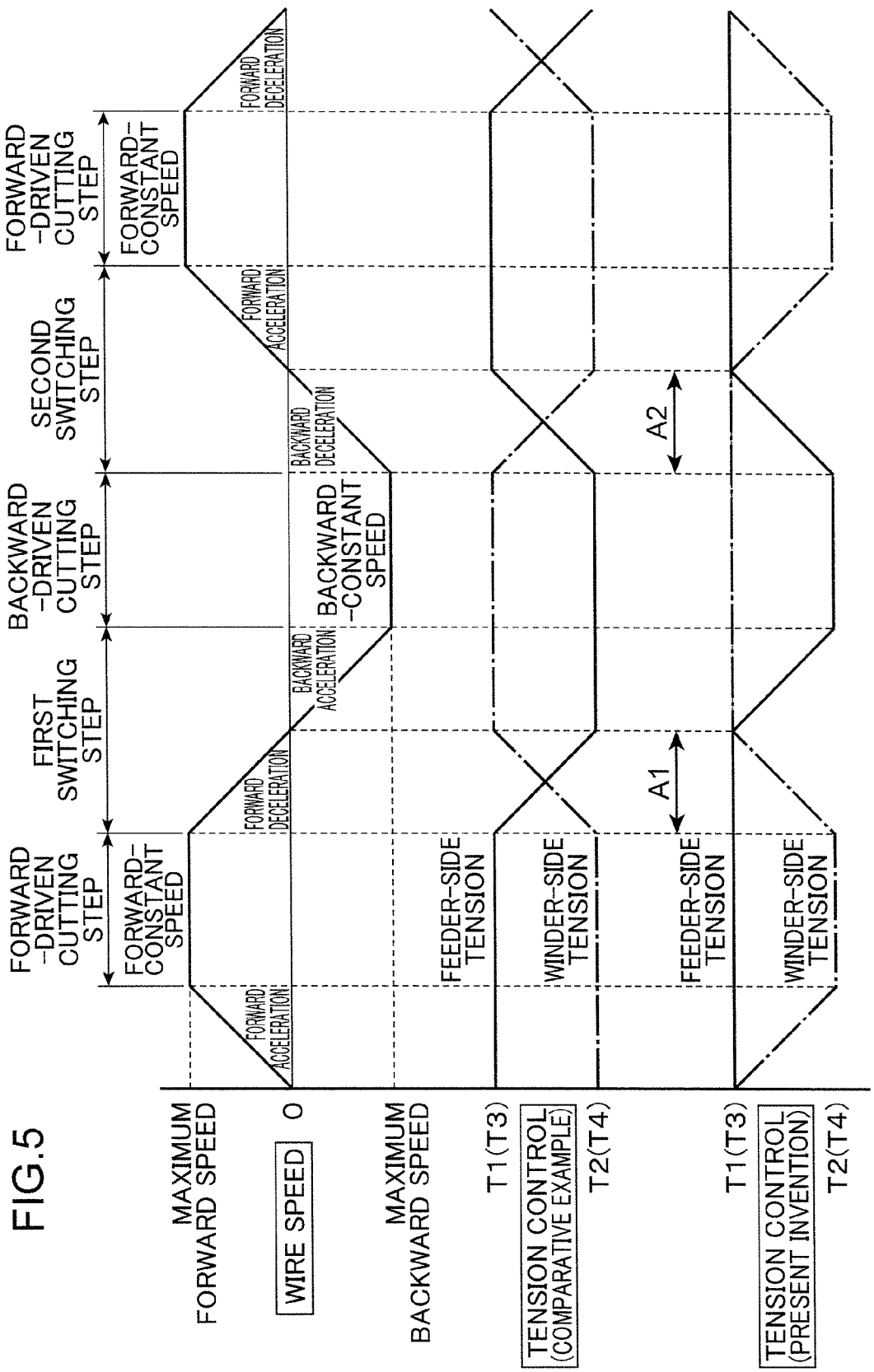
FIG. 5 is a graph showing time variations of wire driving speed and wire target tension in the wire saw.

The target tension setting section 66, which sets a target tension T of the wire W as described above and inputs the same to the tension adjustment section 62, has a feature of varying the target tension T, as shown on a lowermost line in FIG. 5, in accordance with the steps described above. Specifics thereof are as follows.

1. Forward-driven cutting step: In this step, the target tension setting section 66 fixes the target tension T on the side of the wire feeder 10A at a first target tension T1 and fixes the target tension T on the side of the wire winder 10B at a second target tension T2 lower than the first target tension T1.

2. First switching step: In this step, the target tension setting section 66 gradually increases the target tension T on the side of the wire winder 10B from the second target tension T2 to a third target tension T3 higher than the second target tension T2. Conversely, the target tension setting section 66 gradually reduces the target tension T on the side of the wire feeder 10A from the first target tension T1 to a fourth target tension T4 lower than either of the first target tension T1 and the third target tension T3.

Furthermore, as a feature of the present wire saw, the target tension setting section 66 increases and reduces the target tension T in conformance with deceleration and acceleration timings of the driving speed of the wire W, as shown on uppermost and lowermost lines in FIG. 5. Specifically, the target tension setting section 66 starts increasing the target tension T on the side of the wire winder 10B at approximately the same time as start of the deceleration of the wire driving speed and makes the target tension T reach the third target tension T3 (>T2) at approximately the same time as completion of the deceleration. Next, the target tension setting section 66 starts reducing the target tension T on the side of the wire feeder 10A after the completion of the deceleration of the wire driving speed (at approximately the same time as the completion) and makes the target tension T reach the fourth target tension T4 (<T1) at approximately the same time as completion of the backward acceleration.

3. Backward-driven cutting step: In this step, the target tension setting section 66 fixes the target tension T on the side of the wire winder 10B at the third target tension T3 and fixes the target tension T on the side of the wire feeder 10A at the fourth target tension T4.

4. Second switching step: In this step, the target tension setting section 66 gradually increases the target tension T on the side of the wire feeder 10A from the fourth target tension T4 to the first target tension T1. Conversely, the target tension setting section 66 gradually reduces the target tension T on the side of the wire winder 10B from the third target tension T3 to the second target tension T2.

Furthermore, as a feature of the present wire saw, the target tension setting section 66 increases and reduces the target tension T in conformance with deceleration and acceleration timings of the driving speed of the wire W in a similar manner to the first switching step, described above as shown on uppermost and lowermost lines in FIG. 5. Specifically, the target tension setting section 66 starts increasing the target tension T on the side of the wire feeder 10A at approximately the same time as the start of deceleration of the wire driving speed and restores the target tension T to the first target tension T1 (>T4) at approximately the same time as completion of the deceleration. Next, the target tension setting section 66 starts reducing the target tension T on the side of the wire winder 10B after the completion of deceleration of the wire driving speed (at approximately the same time as the completion) and restores the target tension T to the second target tension T2 (<T3) at approximately the same time as completion of the backward acceleration.

Accordingly, a relationship between the respective steps and target tension can be summarized by the following table.

TABLE 1

| | | TARGET TENSION T | |
|---|---|---|---|
| STEP | | WIRE FEEDER SIDE | WIRE WINDER SIDE |
| FORWARD-DRIVEN CUTTING STEP | | FIXED AT T1 | FIXED AT T2 |
| FIRST SWITCHING STEP | FORWARD DECELERATION | FIXED AT T1 | T2 → T3 (INCREASED) |
| | BACKWARD ACCELERATION | T1 → T4 (REDUCED) | FIXED AT T3 |
| BACKWARD-DRIVEN CUTTING STEP | | FIXED AT T4 | FIXED AT T3 |
| SECOND SWITCHING STEP | BACKWARD DECELERATION | T4 → T1 (INCREASED) | FIXED AT T3 |
| | FORWARD ACCELERATION | FIXED AT T1 | T3 → T2 (REDUCED) |

Respective specific numerical values of the target tension T1 to T4 described above can be set arbitrarily. In the present embodiment, each of the first target tension T1 and the third target tension T3 is set to 25 (N), and each of the second target tension T2 and the fourth target tension T4 is set to 13 (N). In addition, a speed of shifting the target tension T in each switching step is set so that the shift approximately coincides with a point of completion of deceleration of wire driving speed in the switching step (in other words, a point at which the wire W is stopped).

Next will be described details of operations of the wire saw and contents of control of the wire driving speed and the wire tension in each of the aforementioned, with additional reference to the flow chart shown in FIG. 5.

1. Forward-Driven Cutting Step

In this step, the bobbin 9A of the wire feeder 10A is rotationally driven in a feeding direction while the bobbin 9B of the wire winder 10B is rotationally driven in a winding direction, and the wire W is thereby fed from the bobbin 9A and wound by the bobbin 9B. By both of thus driving the wire W in the feeding direction and cutting-feeding the workpiece 28, cutting of the workpiece 28 is carried out.

At this point, the target tension setting section 66 sets the target tension T of the wire W on the side of the wire feeder 10A to the first target tension T1 (for example, 25 N), and sets the target tension T of the wire W on the side of the wire winder 10B to the second target tension T2 (for example, 13 N). In response to the setting of the target tension T, the tension adjustment section 62 adjusts a driving force of each swinging cylinder 50 so as to approximate the detected tension by the tension detector 40 on the side of the wire feeder 10A and detected tension by the tension detector 40 on the side of the wire winder 10B to the first target tension T1 and the second target tension T2, respectively.

Meanwhile, a detected signal of the encoder 52 provided in the tension manipulator 18A (in other words, a detected signal of a position of the movable pulley 20A) is fed into the speed adjustment section 64. The speed adjustment section 64 compares the detected position of the movable pulley 20A with the reference position set in advance, and, when the former is higher than the latter, increases the rotational speed of the bobbin 9A that is a wire-feeding bobbin to lower the movable pulley 20A. Conversely, when the former is lower than the latter, the speed adjustment section 64 reduces the rotational speed of the bobbin 9A that is a wire-feeding bobbin to raise the movable pulley 20A. By such control, the movable pulley 20A is approximately maintained at the reference position in a steady state and a margin of movement of the movable pulley 20A is secured.

Due to the control described above, the wire tension on the side of the wire feeder 10A is approximately maintained at the first target tension T1, and, thereby, wire tension necessary for excellently cutting the workpiece 28 between the guide rollers 24A and 24B is secured. Meanwhile, since the wire tension on the side of the wire winder 10B is approximately held at the second target tension T2, biting by the wire W at the bobbin 9B of the wire winder 10B is alleviated and a mechanical burden imposed on the wire winder 10B is reduced.

2. First Switching Step

After the forward-driven cutting step is performed by just a predetermined first wire length (for example, 300 m), the step is shifted to the first switching step. In this step, first, the driven wire W is gradually decelerated (forward deceleration). Then, at the time when the driving speed becomes zero, that is, when forward deceleration is completed, the driving direction of the wire W is reversed and the wire W is gradually accelerated (backward acceleration), and the step is shifted to the backward-driven cutting step. Driving of the wire W is thus gradually switched from forward driving to backward driving.

At this point, as a feature of the present wire saw, the target tension setting section 66 changes the target tension as shown on the lowermost line in FIG. 5. Specifically, at approximately the same time as the deceleration of the wire W, the target tension setting section 66 starts increasing the target tension T on the side of the wire winder 10B from the previously-set second target tension T2 and makes the target tension T reach the third target tension T4 (in the present embodiment, 25 N) by the completion of the forward deceleration. Furthermore, upon completion of the forward deceleration, the target tension setting section 66 starts reducing the target tension T on the side of the wire feeder 10A from the previously-set first target tension T1 and makes the target tension T reach the fourth target tension T4 (for example, 13 N) by the completion of the backward acceleration. In conjunction therewith, actual wire tension increase and decrease: by the start of backward driving, the wire tension on the side of the wire winder 10B will have been increased to approximately 25 N; by the completion of backward acceleration, the wire tension on the side of the wire feeder 10A will have been reduced to approximately 13 N.

3. Backward-Driven Cutting Step

In this step, the bobbin 9B of the wire winder 10B is rotationally driven in the feeding direction while the bobbin 9A of the wire feeder 10A is rotationally driven in the winding direction, and the wire W is thereby fed from the bobbin 9B and wound by the bobbin 9A. At this point, the tension control has been completely shifted to a control of approximating the wire tension on the side of the wire winder 10B to the third target tension T3 and approximating the wire tension on the side of the wire feeder 10A to the fourth target tension T4; this enables, similarly to the forward-driven cutting step described above, the wire tension ($\cong$25 N) necessary for excellently cutting the workpiece 28 between the guide rollers 24A and 24B to be secured, and enables the wire tension ($\cong$13 N) on the side of the wire feeder 10A which has become the one at the winding side to be suppressed to reduce the mechanical burden imposed on the wire feeder 10A.

4. Second Switching Step

After the backward-driven cutting step is performed by just a second wire length (for example, 100 m) smaller than the first wire length, the step is shifted to the second switching step. Also in this step, first, driving of the wire W is gradually decelerated (backward deceleration), and at the time when the driving direction of the wire W is reversed at a point where the speed of the wire W becomes zero or, that is, upon completion of backward deceleration, the direction of driving the wire W is reversed and is gradually accelerated (forward acceleration), and the step is thus shifted to the forward-driven cutting step. Driving of the wire W is thus gradually switched from backward driving to forward driving.

Also at this point, the target tension setting section 66 changes the target tension as shown on the lowermost line in FIG. 5. Specifically, at approximately the same time as the deceleration of the wire W, the target tension setting section 66 starts increasing the target tension T on the side of the wire feeder 10A from the previously-set fourth target tension T4 and restores the target tension T on the side of the wire feeder 10A to the first target tension T1 at approximately the same time as the completion of the deceleration. Furthermore, upon completion of the backward deceleration, the target tension setting section 66 starts reducing the target tension T on the side of the wire winder 10B from the previously-set third target tension T3 and restores the target tension T on the side of the wire winder 10B to the second target tension T2 by the completion of the forward acceleration. In conjunction therewith, actual wire tension is restored: by the start of forward driving in the next forward-driven cutting step, the wire tension on the side of the wire feeder 10A is increased to approximately 25 N; conversely, the wire tension on the side of the wire winder 10B is reduced to approximately 13 N.

As described above, according to this device, it is possible to reduce only the winder-side wire tension to reduce a mechanical burden imposed on the winding-side bobbin (the bobbin 9B during forward movement and the bobbin 9A during backward movement) while securing wire tension necessary for stable cutting, by effective utilization of the tension manipulators 18A and 18B, for tension adjustment, provided on the side of the wire feeder 10A and on the side of the wire winder 10B, in spite of using a reciprocal drive system of repetitively driving the wire W forward and backward. Furthermore, switching the tension during the first switching step and the second switching step for wire reversal can prevent a time loss attributable to the switching of tension from occurring.

In addition, according to this wire saw, reducing the wire target tension on the side of the wire feeder 10A in the first switching step and reducing the wire target tension on the side of the wire winder 10B in the second switching step are started after the completion of the deceleration of the wire driving speed respectively, which makes it possible to avoid a decline in accuracy of processing the workpiece 28 due to a reduction in the target tension.

For example, in the case of a comparative example shown on a middle line in FIG. 5 in which reducing the wire target tension on the side of the wire feeder 10A in the first switching step and reducing the wire target tension on the side of the wire winder 10B in the second switching step are started, respectively, at approximately the same time as the start of deceleration of the wire driving speed, that is, when reducing the wire target tension is performed within each of deceleration periods A1 and A2 shown in FIG. 5, there is a risk that a portion of the wire W in which portion the tension has been actually reduced due to the reduction in the target tension may enter a region where the wire W is wound around the guide rollers 24A, 24B, 26A, and 26B shown in FIG. 1, that is, a region directly contributing to the cutting of the workpiece 28; this may adversely affect the accuracy of processing the workpiece 28. However, since reducing the wire target tension on the side of the wire feeder 10A in the first switching step and reducing the wire target tension on the side of the wire winder 10B in the second switching step are started after the completion the deceleration periods A1 and A2 as shown on the lowermost line in FIG. 5, respectively, it is reliably prevented that a portion of the wire W in which portion the tension has been actually reduced due to the reduction of the target tension enters the cutting contributing region; thus, a decline in the workpiece processing accuracy attributable thereto is prevented.

Figure 6:
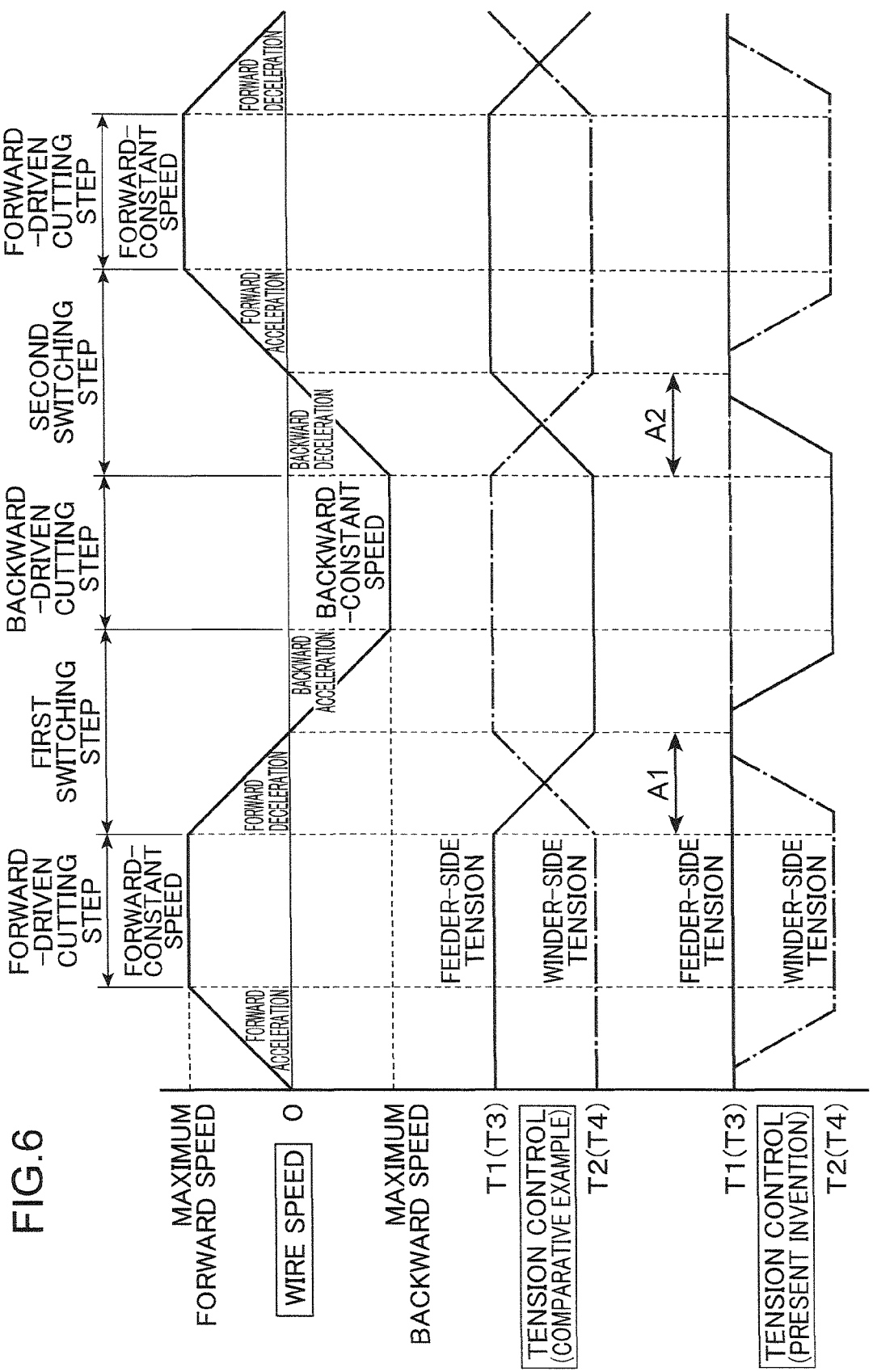
FIG. 6 is a graph showing a modification of time variations of the wire driving speed and the wire target tension.

While, in the example shown on the lowermost line in FIG. 5, increasing the low-tension-side target tension is started upon the start of each of the deceleration periods A1 and A2 and reducing the target tension is started immediately after the completion of each of the deceleration periods A1 and A2 during each of the switching steps, the timings thereof may be staggered. For example, as shown on a lowermost line in FIG. 6, increasing the target tension may be started after a delay from the start of each of the deceleration periods A1 and A2, or reducing the target tension may be started after a delay from the completion of each of the deceleration periods A1 and A2. What is important is only to switch the target tension in synchronization with each of the switching steps and to start reducing the target tension after the completion (including at the same time as completion) of deceleration of the wire driving speed and complete it before the completion of acceleration of the wire driving speed in the opposite direction.

In addition, although both the first switching step and the second switching step are utilized as tension switching periods in the embodiment described above, it is also possible to utilize one of the switching steps as one of the tension switching periods while letting the other tension switching period extend off the other switching step. Even this configuration enables operation efficiency to be enhanced by a time loss reduction by the utilization as the one tension switching period.

Besides, the present invention can adopt, for example, the following modes.

In the present invention, the first target tension T1 and the third target tension T3 need not be equal to each other and, similarly, the second target tension T2 and the fourth target tension T4 need not be equal to each other. These target tensions can be arbitrarily set under a condition that the target tensions T2 and T4 be lower than the target tensions T1 and T3, respectively.

In the present invention, a specific configuration of tension control is not particularly limited. For example, the fine adjustment of the wire driving speed by the speed adjustment section 64 can be omitted as long as a sufficient movable range is secured for the movable pulleys 20A and 20B. Besides, there may be performed such a control as to increase wire tension (tension in a wire portion that contributes to cutting the workpiece 28) temporarily at the beginning of workpiece cutting.

Specific structures of the respective tension manipulators 18A and 18B also can be modified as appropriate. For example, the movable pulleys 20A and 20B may be guided by a rail or the like to be linearly displaced by a feed screw mechanism, a rack-and-pinion mechanism, or the like. Besides, in the case of using the lever 44, means for swinging the lever 44 is not limited to the above swinging cylinder 50 but, for example, a servo motor may be used.

As described above, the present invention provides a technique that enables time loss due to an adjustment of wire tension for reversing a driving direction of a wire in a wire saw to be effectively reduced while preventing such tension adjustment from causing a decline in accuracy of processing a workpiece. Specifically, the present invention provides a method of cutting a workpiece by using a wire saw in which a cutting wire fed from a wire feeder is wound around a plurality of guide rollers and then wound by a wire winder and by simultaneously performing cutting-feeding of relatively moving the workpiece with respect to a plurality of wires aligned between the guide rollers, while driving the wires in an axial direction thereof. The method comprises: a forward-driven cutting step of cutting the workpiece while feeding the wire from the wire feeder and winding the wire with the wire winder, adjusting tension in a wire fed from the wire feeder so as to approximate the tension in the wire fed from the wire feeder to a first target tension by pressing a feeding-side tension-application member against the wire fed from the wire feeder, and adjusting tension in a wire wound by the wire winder so as to approximate the tension in the wire wound by the wire winder to a second target tension lower than the first target tension by pressing a winding-side tension-application member against the wire wound by the wire winder; a backward-driven cutting step of cutting the workpiece while reversely feeding the wire wound by the wire winder from the wire winder and winding the wire with the wire feeder, adjusting tension in a wire fed from the wire winder so as to approximate the tension in the wire to a third target tension higher than the second target tension by pressing the winding-side tension-application member against the wire, and adjusting tension in a wire wound by the wire feeder so as to approximate the tension in the wire to a fourth target tension lower than either of the first target tension and the third target tension by pressing the feeding-side tension-application member against the wire; a first switching step of decelerating a driving speed of the wire after the forward-driven cutting step, reversing the driving direction of the wire and thereafter accelerating the driving speed of the wire to shift to the backward-driven cutting step; and a second switching step of decelerating a driving speed of the wire after the backward-driven cutting step, reversing the driving direction of the wire and thereafter accelerating the driving speed of the wire to shift to the forward-driven cutting step, wherein the forward-driven cutting step, the first switching step, the backward-driven cutting step, and the second switching step are repetitively performed in this order. In addition, in the first switching step, an adjustment of tension in the wire at a side of the wire winder is performed with the winding-side tension-application member during the deceleration of the wire driving speed so as to increase a target tension as to the wire at the side of the wire winder from the second target tension to the third target tension, and an adjustment of tension in the wire at a side of the wire feeder is performed with the feeding-side tension-application member, after completion of the deceleration of the wire driving speed, so as to reduce a target tension as to the wire at the side of the wire feeder from the first target tension to the fourth target tension.

According to this method, upon reversal of the driving direction of the wire in the first switching step, the wire tensions can be switched by utilization of the time required to decelerate and subsequently accelerate the wire in the first switching step; this allows no time loss for switching the tension to occur. Furthermore, performing the adjustment for reducing wire tension from the first target tension to the fourth target tension after the completion of the deceleration of the wire prevents a wire portion in which the tension has been reduced due to the adjustment from entering a cutting/processing region between the guide rollers and thus prevents a workpiece processing accuracy attributable thereto from decline.

Besides, in the method of cutting a workpiece according to the present invention, instead of shifting the target tension in the first switching step or in addition to shifting the target tension in the first switching step, there may be performed, in the second switching step, an adjustment of tension in the wire at the side of the wire winder with the winding-side tension-application member while reducing a target tension as to the wire at the side of the wire winder from the third target tension the wire to the second target tension, and an adjustment of tension in the wire at the side of the wire feeder with the feeding-side tension-application member while increasing a target tension as to the wire at the side of the wire feeder from the fourth target tension to the first target tension. This eliminates a time loss due to the switching the tensions. Also in the second switching step, performed is such a tension adjustment as to increase the wire target tension from the fourth target tension to the first target tension during the deceleration of the driving speed of the wire and such a control as to reduce, after the completion of the deceleration of the wire driving speed, the wire target tension from the third target tension to the second target tension; thereby, a wire portion in which the tension has been reduced due to the adjustment is prevented from entering a cutting/processing region between the guide rollers and workpiece processing accuracy attributable thereto is prevented from decline.

Operations for adjusting the tension in the wire in the steps preferably includes an operation for detecting an actual tension in the wire and an operation for pressing the tension-application members against the wire at respective predetermined locations of the wire so as to approximate the detected tension to a target tension.

Besides, the present invention provides a wire saw for simultaneously cutting a workpiece at a plurality of locations using a cutting wire. The wire saw comprises: a plurality of guide rollers arranged so that respective rotational central axes thereof are parallel to each other, the wire being wound the guide rollers; a wire feeder for feeding the wire to the guide rollers; a wire winder for winding the wire from the guide rollers; a cutting feeder which cutting-feeds a workpiece to cut the workpiece by moving a plurality of wires stretched between specific guide rollers among the guide rollers and the workpiece relatively to each other; a wire drive control device which controls respective operations of the wire feeder and the wire winder so as to perform a forward-driven cutting step of cutting the workpiece while feeding the wire from the wire feeder and winding the wire with the wire winder, a backward-driven cutting step of cutting the workpiece while reversely feeding the wire wound by the wire winder from the wire winder and winding the wire with the wire feeder, a first switching step of decelerating a driving speed of the wire after the forward-driven cutting step, reversing the driving direction of the wire and thereafter accelerating the driving speed of the wire to shift to the backward-driven cutting step, and a second switching step of decelerating a driving speed of the wire after the backward-driven cutting step, reversing the driving direction of the wire and thereafter accelerating the driving speed of the wire to shift to the forward-driven cutting step, in an order of the forward-driven cutting step, the first switching step, the backward-driven cutting step, and the second switching step; a feeding-side tension manipulator including a feeding-side tension-application member to be pressed against the wire in a region between the wire feeder and the respective guide rollers, the feeding-side tension manipulator varying the tension in the wire by varying a pressing force of the feeding-side tension-application member; a winding-side tension manipulator including a winding-side tension-application member to be pressed against the wire in a region between the wire winder and the respective guide rollers, the winding-side tension manipulator varying the tension in the wire by varying a pressing force of the winding-side tension-application member; and a tension control device which operates the respective tension manipulators so as to approximate tension in a wire fed from the wire feeder to a first target tension and approximate tension in a wire wound by the wire winder to a second target tension lower than the first target tension in the forward-driven cutting step and so as to approximate tension in a wire fed from the wire winder to a third target tension higher than the second target tension and approximate tension in a wire wound by the wire feeder to a fourth target tension lower than either of the first target tension and the third target tension in the backward-driven cutting step. The tension control device operates the respective tension manipulators to perform an adjustment of tension in the wire at the side of the wire winder, during deceleration of the wire driving speed, so as to increase a target tension as to the wire at the side of the wire winder from the second target tension to the third target tension in the first switching step and to perform an adjustment of tension in the wire at the side of the wire feeder, after completion of deceleration of the wire driving speed, so as to reduce a target tension as to the wire at the side of the wire feeder from the first target tension to the fourth target tension.

Besides, in the wire saw according to the present invention, the tension control device may operate the respective tension manipulators, instead of shifting the target tension in the first switching step or shifting the target tension in the first switching step, so as to perform an adjustment of tension in the wire at the side of the wire winder while reducing a target tension as to the wire at the side of the wire winder from the third target tension to the second target tension and perform an adjustment of tension in the wire at the side of the wire feeder while increasing a target tension as to the wire at the side of the wire feeder from the fourth target tension to the first target tension, during the second switching step. Also in this wire saw, a time loss due to the switching the tensions can be eliminated, and also in the second switching step, performed is such a tension adjustment as to increase the wire target tension from the fourth target tension to the first target tension during the deceleration of the driving speed of the wire and such a control as to reduce, after the completion of the deceleration of the wire driving speed, the wire target tension from the third target tension to the second target tension; thereby, a wire portion in which the tension has been reduced due to the adjustment is prevented from entering a cutting/processing region between the guide rollers and workpiece processing accuracy attributable thereto is prevented from decline.

The tension control device preferably includes: a tension detector which detects respective tensions in a wire in a region from the wire feeder to the guide rollers and in a region from the guide rollers to the wire winder; a target tension setting section which sets a target tension in the wire in each of the steps; and a tension adjustment section which operates the tension manipulators so as to approximate the tension detected in each of the regions to the target tension set by the target tension setting section.

In summary, the present invention makes it possible to cut a workpiece by an efficient operation with less time loss and prevent workpiece processing accuracy from decline due to the tension adjustment while reducing only the tension in the wire on the winding side and, by effective utilization of the devices which manipulate respective tension in a wire by pressing the tension-application member against the wire.

The invention claimed is:

1. A method of cutting a workpiece by using a wire saw in which a cutting wire fed from a wire feeder is wound around a plurality of guide rollers and then wound by a wire winder and by simultaneously performing cutting-feeding of relatively moving the workpiece with respect to a plurality of wires aligned between the guide rollers, while driving the wires in an axial direction thereof, the method comprising:
   a forward-driven cutting step of cutting the workpiece while feeding the wire from the wire feeder and winding the wire with the wire winder, adjusting tension in a wire fed from the wire feeder so as to approximate the tension in the wire fed from the wire feeder to a first target tension by pressing a feeding-side tension-application member against the wire fed from the wire feeder, and adjusting tension in a wire wound by the wire winder so as to approximate the tension in the wire wound by the wire winder to a second target tension lower than the first target tension by pressing a winding-side tension-application member against the wire wound by the wire winder;
   a backward-driven cutting step of cutting the workpiece while reversely feeding the wire wound by the wire winder from the wire winder and winding the wire with the wire feeder, adjusting tension in a wire fed from the wire winder so as to approximate the tension in the wire fed from the wire winder to a third target tension higher than the second target tension by pressing the winding-side tension-application member against the wire fed from the wire winder, and adjusting tension in a wire wound by the wire feeder so as to approximate the tension in the wire wound by the wire feeder to a fourth target tension lower than either of the first target tension and the third target tension by pressing the feeding-side tension-application member against the wire wound by the wire feeder;
   a first switching step of decelerating a driving speed of the wire after the forward-driven cutting step, reversing the driving direction of the wire and thereafter accelerating the driving speed of the wire to shift to the backward-driven cutting step; and
   a second switching step of decelerating a driving speed of the wire after the backward-driven cutting step, reversing the driving direction of the wire and thereafter accelerating the driving speed of the wire to shift to the forward-driven cutting step, wherein the forward-driven cutting step, the first switching step, the backward-driven cutting step, and the second switching step being repetitively performed in this order, wherein,
   in the first switching step, an adjustment of tension in the wire at a side of the wire winder is performed with the winding-side tension-application member, during the deceleration of the wire driving speed, so as to increase a target tension as to the wire at the side of the wire winder from the second target tension to the third target tension, and an adjustment of tension in the wire at a side of the wire feeder is performed with the feeding-side tension-application member, after completion of the deceleration of the wire driving speed, so as to reduce a target tension as to the wire at the side of the wire feeder from the first target tension to the fourth target tension.

2. The method of cutting a workpiece using a wire saw according to claim 1, wherein
   operations for adjusting the tension in the wire in each of the steps includes:
   an operation for detecting an actual tension in the wire; and
   an operation for pressing the tension-application members against the wire at respective predetermined locations so as to approximate the detected tension to a target tension.

3. A method of cutting a workpiece by using a wire saw in which a cutting wire fed from a wire feeder is wound around a plurality of guide rollers and then wound by a wire winder and by simultaneously performing cutting-feeding of relatively moving the workpiece with respect to a plurality of wires aligned between the guide rollers, while driving the wires in an axial direction thereof, the method comprising:
   a forward-driven cutting step of cutting the workpiece while feeding the wire from the wire feeder and winding the wire with the wire winder, adjusting tension in a wire fed from the wire feeder so as to approximate the tension in the wire fed from the wire feeder to a first target tension by pressing a feeding-side tension-application member against the wire fed from the wire feeder, and adjusting tension in a wire wound by the wire winder so as to approximate the tension in the wire wound by the wire winder to a second target tension lower than the first target tension by pressing a winding-side tension-application member against the wire wound by the wire winder;
   a backward-driven cutting step of cutting the workpiece while reversely feeding the wire wound by the wire winder from the wire winder and winding the wire with the wire feeder, adjusting tension in a wire fed from the wire winder so as to approximate the tension in the wire fed from the wire winder to a third target tension higher than the second target tension by pressing the winding-side tension-application member against the wire fed from the wire winder, and adjusting tension in a wire wound by the wire feeder so as to approximate the tension in the wire wound by the wire feeder to a fourth target tension lower than either of the first target tension and the third target tension by pressing the feeding-side tension-application member against the wire wound by the wire feeder;

a first switching step of decelerating a driving speed of the wire after the forward-driven cutting step, reversing the driving direction of the wire and thereafter accelerating the driving speed of the wire to shift to the backward-driven cutting step; and a second switching step of decelerating a driving speed of the wire after the backward-driven cutting step, reversing the driving direction of the wire and thereafter accelerating the driving speed of the wire to shift to the forward-driven cutting step, wherein the forward-driven cutting step, the first switching step, the backward-driven cutting step, and the second switching step being repetitively performed in this order, wherein, in the second switching step, an adjustment of tension in the wire at a side of the wire feeder is performed with the feeding-side tension-application member, during deceleration of the wire driving speed, so as to increase a target tension as to the wire at the side of the wire feeder from the fourth target tension to the first target tension, and an adjustment of tension in the wire at a side of the wire winder is performed with the winding-side tension-application member, after completion of deceleration of the wire driving speed, so as to reduce a target tension as to the wire at the side of the wire winder from the third target tension to the second target tension.

4. The method of cutting a workpiece using a wire saw according to claim 3, wherein in the first switching step, an adjustment of tension in the wire at the side of the wire winder is performed with the winding-side tension-application member, during deceleration of the wire driving speed, so as to increase a target tension as to the wire at the side of the wire winder from the second target tension to the third target tension, and an adjustment of tension in the wire at the side of the wire feeder is performed with the feeding-side tension-application member, after completion of deceleration of the wire driving speed, so as to reduce a target tension as to the wire at the side of the wire feeder from the first target tension to the fourth target tension.

5. The method of cutting a workpiece using a wire saw according to claim 4, wherein operations for adjusting the tension in the wire in each of the steps includes:
an operation for detecting an actual tension in the wire; and
an operation for pressing the tension-application members against the wire at respective predetermined locations so as to approximate the detected tension to a target tension.

6. The method of cutting a workpiece using a wire saw according to claim 3, wherein operations for adjusting the tension in the wire in each of the steps includes:
an operation for detecting an actual tension in the wire; and
an operation for pressing the tension-application members against the wire at respective predetermined locations so as to approximate the detected tension to a target tension.

7. A wire saw for simultaneously cutting a workpiece at a plurality of locations using a cutting wire, the wire saw comprising:

a plurality of guide rollers arranged so that respective rotational central axes thereof are parallel to each other, the wire being wound the guide rollers;

a wire feeder for feeding the wire to the guide rollers;

a wire winder for winding the wire from the guide rollers;

a cutting feeder which cutting-feeds a workpiece to cut the workpiece by moving a plurality of wires stretched between specific guide rollers among the guide rollers and the workpiece relatively to each other;

a wire drive control device which controls respective operations of the wire feeder and the wire winder so as to perform a forward-driven cutting step of cutting the workpiece while feeding the wire from the wire feeder and winding the wire with the wire winder, a backward-driven cutting step of cutting the workpiece while reversely feeding the wire wound by the wire winder from the wire winder and winding the wire with the wire feeder, a first switching step of decelerating a driving speed of the wire after the forward-driven cutting step, reversing the driving direction of the wire and thereafter accelerating the driving speed of the wire to shift to the backward-driven cutting step, and a second switching step of decelerating a driving speed of the wire after the backward-driven cutting step, reversing the driving direction of the wire and thereafter accelerating the driving speed of the wire to shift to the forward-driven cutting step, in an order of the forward-driven cutting step, the first switching step, the backward-driven cutting step, and the second switching step;

a feeding-side tension manipulator including a feeding-side tension-application member to be pressed against the wire in a region between the wire feeder and the respective guide rollers, the feeding-side tension manipulator varying the tension in the wire by varying a pressing force of the feeding-side tension-application member;

a winding-side tension manipulator including a winding-side tension-application member to be pressed against the wire in a region between the wire winder and the respective guide rollers, the winding-side tension manipulator varying the tension in the wire by varying a pressing force of the winding-side tension-application member; and a tension control device which operates the respective tension manipulators so as to approximate tension in a wire fed from the wire feeder to a first target tension and approximate tension in a wire wound by the wire winder to a second target tension lower than the first target tension in the forward-driven cutting step and so as to approximate tension in a wire fed from the wire winder to a third target tension higher than the second target tension and approximate tension in a wire wound by the wire feeder to a fourth target tension lower than either of the first target tension and the third target tension in the backward-driven cutting step, wherein, the tension control device operates the respective tension manipulators, in the first switching step, to perform an adjustment of tension in the wire at a side of the wire winder, during deceleration of the wire driving speed, so as to increase a target tension as to the wire at the side of the wire winder from the second target tension to the third target tension and to perform an adjustment of tension in the wire at a side of the wire feeder, after completion of deceleration of the wire driving speed, so as to reduce a target tension as to the wire at the side of the wire feeder from the first target tension to the fourth target tension.

8. The wire saw according to claim 7, wherein the tension control device includes:
a tension detector which detects respective tensions in a wire in a region from the wire feeder to the guide rollers and in a region from the guide rollers to the wire winder;
a target tension setting section which sets a target tension in the wire in each of the steps; and
a tension adjustment section which operates the tension manipulators so as to approximate the tension detected in each of the regions to the target tension set by the target tension setting section.

9. A wire saw for simultaneously cutting a workpiece at a plurality of locations using a cutting wire, the wire saw comprising:
a plurality of guide rollers arranged so that respective rotational central axes thereof are parallel to each other, the wire being wound the guide rollers;
a wire feeder for feeding the wire to the guide rollers;
a wire winder for winding the wire from the guide rollers;
a cutting feeder which cutting-feeds a workpiece to cut the workpiece by moving a plurality of wires stretched between specific guide rollers among the guide rollers and the workpiece relatively to each other;
a wire drive control device which controls respective operations of the wire feeder and the wire winder so as to perform a forward-driven cutting step of cutting the workpiece while feeding the wire from the wire feeder and winding the wire with the wire winder, a backward-driven cutting step of cutting the workpiece while reversely feeding the wire wound by the wire winder from the wire winder and winding the wire with the wire feeder, a first switching step of decelerating a driving speed of the wire after the forward-driven cutting step, reversing the driving direction of the wire and thereafter accelerating the driving speed of the wire to shift to the backward-driven cutting step, and a second switching step of decelerating a driving speed of the wire after the backward-driven cutting step, reversing the driving direction of the wire and thereafter accelerating the driving speed of the wire to shift to the forward-driven cutting step, in an order of the forward-driven cutting step, the first switching step, the backward-driven cutting step, and the second switching step;
a feeding-side tension manipulator including a feeding-side tension-application member to be pressed against the wire in a region between the wire feeder and the respective guide rollers, the feeding-side tension manipulator varying the tension in the wire by varying a pressing force of the feeding-side tension-application member;
a winding-side tension manipulator including a winding-side tension-application member to be pressed against the wire in a region between the wire winder and the respective guide rollers, the winding-side tension manipulator varying the tension in the wire by varying a pressing force of the winding-side tension-application member; and
a tension control device which operates the respective tension manipulators so as to approximate tension in a wire fed from the wire feeder to a first target tension and approximate tension in a wire wound by the wire winder to a second target tension lower than the first target tension in the forward-driven cutting step and so as to approximate tension in a wire fed from the wire winder to a third target tension higher than the second target tension and approximate tension in a wire wound by the wire feeder to a fourth target tension lower than either of the first target tension and the third target tension in the backward-driven cutting step, wherein,
the tension control device operates the respective tension manipulators, in the second switching step, to perform an adjustment of tension in the wire at a side of the wire feeder, during deceleration of the wire driving speed, so as to increase a target tension as to the wire at the side of the wire feeder from the fourth target tension to the first target tension and to perform an adjustment of tension in the wire at a side of the wire winder, after completion of deceleration of the wire driving speed, so as to reduce a target tension as to the wire at the side of the wire winder from the third target tension to the second target tension.

10. The wire saw according to claim 9, wherein the tension control device operates the respective tension manipulators, in the first switching step, to perform an adjustment of tension in the wire at the side of the wire winder during deceleration of the wire driving speed so as to increase a target tension as to the wire at the side of the wire winder from the second target tension to the third target tension and to perform an adjustment of tension in the wire at the side of the wire feeder, after completion of deceleration of the wire driving speed, so as to reduce a target tension as to the wire at the side of the wire feeder from the first target tension to the fourth target tension.

11. The wire saw according to claim 10, wherein the tension control device includes:
a tension detector which detects respective tensions in a wire in a region from the wire feeder to the guide rollers and in a region from the guide rollers to the wire winder;
a target tension setting section which sets a target tension in the wire in each of the steps; and
a tension adjustment section which operates the tension manipulators so as to approximate the tension detected in each of the regions to the target tension set by the target tension setting section.

12. The wire saw according to claim 9, wherein the tension control device includes:
a tension detector which detects respective tensions in a wire in a region from the wire feeder to the guide rollers and in a region from the guide rollers to the wire winder;
a target tension setting section which sets a target tension in the wire in each of the steps; and
a tension adjustment section which operates the tension manipulators so as to approximate the tension detected in each of the regions to the target tension set by the target tension setting section.

* * * * *